United States Patent
Fujishiro et al.

(10) Patent No.: US 8,797,637 B2
(45) Date of Patent: Aug. 5, 2014

(54) COLOR DISPLAY DEVICE FOR ELECTRONIC PAPER, AND PROCESS FOR PRODUCTION THEREOF

(75) Inventors: Koichi Fujishiro, Kisarazu (JP); Toshihide Itahara, Kisarazu (JP); Tohru Saito, Kisarazu (JP); Takahiro Yoshioka, Kisarazu (JP); Shinsuke Iguchi, Chigasaki (JP); Kentaro Kumita, Sammu (JP); Tomoharu Takita, Sammu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/702,016

(22) PCT Filed: Jun. 3, 2011

(86) PCT No.: PCT/JP2011/062813
§ 371 (c)(1),
(2), (4) Date: Dec. 4, 2012

(87) PCT Pub. No.: WO2011/155410
PCT Pub. Date: Dec. 15, 2011

(65) Prior Publication Data
US 2013/0088769 A1 Apr. 11, 2013

(30) Foreign Application Priority Data
Jun. 7, 2010 (JP) .................................. 2010-130042

(51) Int. Cl.
G02B 26/00 (2006.01)
(52) U.S. Cl.
USPC ......................................................... 359/296
(58) Field of Classification Search
USPC ......................................................... 359/296
See application file for complete search history.

(56) References Cited

U.S. PATENT DOCUMENTS

| 7,006,277 | B2 | 2/2006 | Mizuno | |
| 2003/0214567 | A1* | 11/2003 | Kanazawa et al. | 347/112 |
| 2009/0207475 | A1* | 8/2009 | Jung et al. | 359/296 |

FOREIGN PATENT DOCUMENTS

| JP | 11-281815 A | 10/1999 |
| JP | 2001-350012 A | 12/2001 |

(Continued)

OTHER PUBLICATIONS

International Search Report for the Application No. PCT/JP2011/062813 mailed Jun. 28, 2011.

(Continued)

*Primary Examiner* — James Jones
(74) *Attorney, Agent, or Firm* — Cheng Law Group, PLLC

(57) ABSTRACT

Provided are a color display device capable of colorized display in a reflection type display device which is adopted to electronic paper and the like without degrading the degree of brightness and with high efficiency, and also with ease and lower costs, and a method of producing the same. The color display device includes: a drive-side substrate (3) on which pixel electrodes (2) connected to pixel switches (1) are formed in a given pattern; a transparent substrate (5) including an electrically conductive layer (4); display media (10) which have white color and black color and are electrically charged; a reflection type display element including the display media (10) disposed between the drive-side substrate (3) and the transparent substrate (5), for forming any appropriate image by pixels corresponding to the pixel electrodes (2); and a color filter (11) provided on the transparent substrate (5) side of the reflection type display element, in which the color filter (11) forms pixel regions (14) by defining the pixels with colorless partition walls (13) which are formed on a substrate, and has colored layers (15) formed therein by ejecting colored inks of three colors, which are colored with at least blue (B), green (G), and red (R), by an inkjet method.

8 Claims, 6 Drawing Sheets

(56) References Cited

FOREIGN PATENT DOCUMENTS

| | | | |
|---|---|---|---|
| JP | 2003-161964 A | 6/2003 | |
| JP | 2004-361514 A | 12/2004 | |
| JP | 2008-83536 A | 4/2008 | |
| JP | 2009-282064 A | 12/2009 | |

OTHER PUBLICATIONS

International Preliminary Report on Patentability for Application No. PCT/JP2011/062813 mailed Dec. 20, 2012.

* cited by examiner

COLOR DISPLAY DEVICE FOR ELECTRONIC PAPER, AND PROCESS FOR PRODUCTION THEREOF

TECHNICAL FIELD

The present invention relates to a reflection type display device including a color filter, and a method of producing the same, and more specifically, to a color display device in which a color filter is formed by using an inkjet method so as to enable a reflection type display device for electronic paper to perform color display, and a method of producing the same.

BACKGROUND ART

As an electronic medium which is an alternative to paper, display devices such as for an electronic paper are actively developed. Contrary to the conventional displays, such as a CRT and a liquid crystal display, electronic paper and the like mainly adopt a reflection type display system which uses display media made of white particles and black particles and the like, need to have a high white reflectance and a high contrast ratio, and, in addition, require a memory effect for a displayed image. It is also required to be capable of being driven under a low voltage, and, further, thin and light, and low in price. Specifically, as display characteristics, a white reflectance and a contrast ratio equivalent to those of paper are required, and there is a great demand for colorization of the display devices, such as electronic paper because, as a matter of course, the conventional paper media display full color.

Among the technologies proposed so far, as electronic paper which is capable of performing color display, there is a product in which a color filter is formed on a liquid crystal element, or the like, but this product uses a polarizing plate and therefore utilization efficiency of light is low, and only dark white color can be displayed. Further, because black color cannot be displayed, a contrast ratio is poor.

Moreover, as a bright reflection type display device, there is known an electrophoresis system whose principle is to move, without using a polarizing plate, white particles and black particles, which have been charged with electricity, by an electric field. Generally, it is said that a scattering reflectance by this electrophoresis system is a little less than 40% at most, and at present, it is required to further improve the reflectance. Particularly, when color display is performed, utilization efficiency of light is degraded due to absorption by a color layer. Therefore, bright color electronic paper is actively researched and developed.

For example, Patent Literatures 1, 2, and 3 propose electrophoresis type display elements in which charged white particles and particles whose black color state is optionally switched are moved by applying a voltage, and further, describe technologies which enable color display by disposing a color filter. However, the conventional color filter, which is used in a liquid crystal display device and the like, includes a black matrix as a shading portion, and overlapping colored pixels, and hence deteriorates the degree of brightness due to the scattered reflected light by the charged particles is partially deteriorated. Moreover, when colored layers of the color filter are formed by photolithography, in order to realize a multicolor display, the same number of steps as the number of the colored layers is needed, and hence the cost of steps and the coloring resist are wastefully used.

By the way, the method of producing a color filter by an inkjet method is already well known for a liquid crystal display device and the like. Red, blue, and green coloring inks are ejected simultaneously at respective necessary points and applied to regions where pixels are formed, and cured so as to form colored layers. At this time, in order to form the colored layers with accuracy, it is necessary to preliminarily form partition walls by photolithography, and eject coloring ink to the regions which are formed by the partition walls. For example, Patent Literature 4 describes that mixture of colors between adjacent pixel regions can be avoided by maintaining the static contact angle between the coloring ink and the partition wall surface within 30 to 55°.

CITATION LIST

Patent Literature
 [PTL 1] JP 2003-161964 A
 [PTL 2] JP 2004-361514 A
 [PTL 3] JP 2008-83536 A
 [PTL 4] JP 11-281815 A
 [PTL 5] JP 2001-350012 A

SUMMARY OF INVENTION

Technical Problem

The present invention has been made in view of the circumstances of the conventional technologies, and an object thereof is to provide a color display device capable of a colorized display in a reflection type display device which is adopted to electronic paper and the like without degrading the degree of brightness and with high efficiency, and also with ease and lower costs, and a method of producing the same.

Solution to Problem

After conducting various studies in order to solve the above-mentioned problem, the inventors of the present invention have found that, in a reflection type display element including micro capsules which contain charged white particles and particles whose black color state is optionally switched by applying a voltage, colorless partition walls define pixels so as to form pixel regions in a color filter which is disposed on a transparent substrate side, thereby enabling colorized display without degrading reflection efficiency and with high efficiency, and, by coloring the pixel regions by using an inkjet method, a used amount of coloring ink can be minimized. As a result, the present invention is completed.

That is, an outline of the present invention is as follows.

(1) A color display device, including: a drive-side substrate on which pixel electrodes connected to pixel switches are formed in a given pattern; a transparent substrate including an electrically conductive layer; display media which have white color and black color and are electrically charged; a reflection type display element including the display media disposed between the drive-side substrate and the transparent substrate, for forming any appropriate image by pixels corresponding to the pixel electrodes; and a color filter provided on the transparent substrate side of the reflection type display element, in which the color filter forms pixel regions by defining the pixels with colorless partition walls formed on a substrate, and has colored layers formed therein by ejecting colored inks of three colors, which are colored with at least blue (B), green (G), and red (R), by an inkjet method.

(2) A color display device according to claim 1, in which: the partition walls are formed by a transparent resin composition; and a part of the pixel regions has a colorless layer which is formed by the transparent resin composition.

(3) A color display device according to claim 1 or 2, in which an area ratio of the colored layers to the pixel regions is 30% or more and 90% or less.

(4) A method of producing a color display device, the color display device including: a drive-side substrate on which pixel electrodes connected to pixel switches are formed in a given pattern; a transparent substrate including an electrically conductive layer; display media which have white color and black color and are electrically charged; a reflection type display element including the display media disposed between the drive-side substrate and the transparent substrate, for forming any appropriate image by pixels corresponding to the pixel electrodes; and a color filter provided on the transparent substrate side of the reflection type display element, the method including: applying a transparent resin composition containing an ultraviolet curing resin to a substrate and forming partition walls by photolithography to define the pixels; and thereafter ejecting colored inks of three colors, which are colored with at least blue (B), green (G), and red (R), by an inkjet method to the pixel regions defined by the partition walls, for forming colored layers in given pixel regions to obtain the color filter.

(5) A method of producing a color display device according to claim 4, in which, when the partition walls are formed by photolithography, a part of the pixel regions is configured to include a colorless layer which is made of the same material as a material of the partition walls.

(6) A method of producing a color display device according to claim 4 or 5, in which the colored inks are ejected by an inkjet method so that an area ratio of the colored layers to the pixel regions becomes 30% or more and 90% or less.

Advantageous Effects of Invention

According to the present invention, in a reflection type display device, colorized display can be realized without degrading the degree of brightness and with high efficiency, and also a used amount of coloring ink can be suppressed to a required amount. Moreover, the present invention enables colorized display with high efficiency, which is appropriate for the reflection type display device.

DESCRIPTION OF EMBODIMENTS

The present invention is described in detail with reference to the drawings hereunder.

Figure 1:
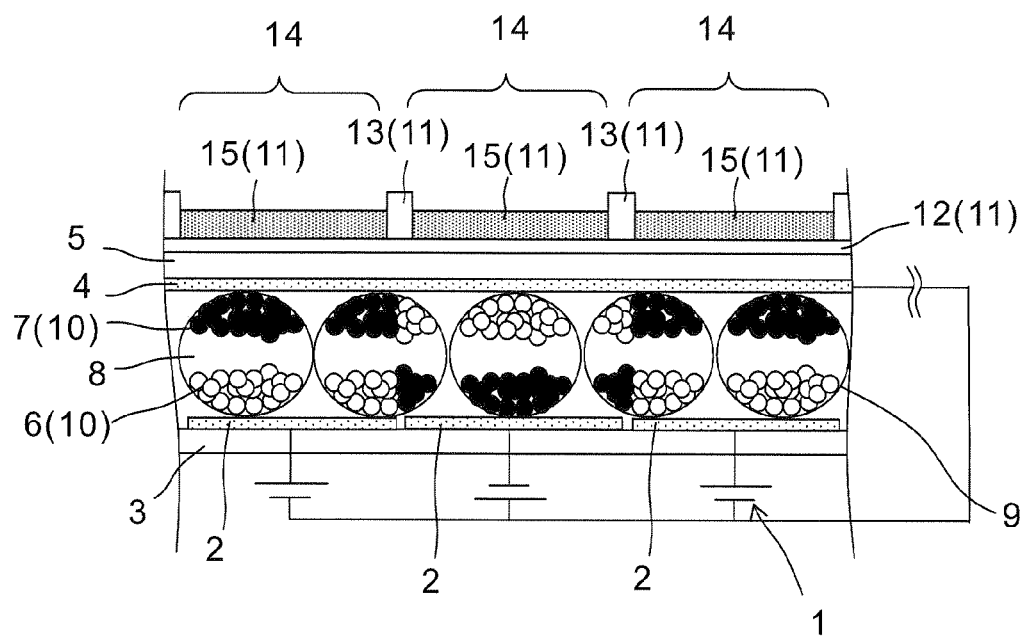
FIG. 1 is a schematic cross-sectional view (partial) illustrating an example of a color display device of the present invention.

An example of a color display device of the present invention is illustrated in a cross sectional view (partial) of FIG. 1. This color display device includes a drive-side substrate 3 on which pixel electrodes 2 connected to pixel switches 1, such as thin film transistors (TFT), are formed in a given pattern, and a transparent substrate 5 including an electrically conductive layer 4, such as ITO glass. Display media 10, which have white color and black color and are electrically charged, are enclosed between the substrates. FIG. 1 illustrates that the display media 10 are formed by white particles 6 and black particles 7, which are charged with electrical charges different from each other, and the display media 10 are dispersed by a transparent dispersion medium 8 so as to be contained in micro capsules 9 having about 1 to 1,000 μm in size, preferably about several tens of micrometers. Alternatively, for example, surface regions of white color and black color may be provided so that display media are formed by rotational particles which are charged with different electric charges corresponding to the regions of different colors.

Then, when a voltage is applied between given pixel electrodes 2 and the electrically conductive layer 4 of the transparent substrate 5 while switching the pixel switches 1, in the case of FIG. 1, the white particles 6 and the black particles 7 move in the direction between the substrates so as to be arranged, or, in the case of rotational particles, the rotational particles rotate so as to be arranged in such a way that the directions of the color regions are aligned in the direction between the substrates. Accordingly, light which enters from the transparent substrate 5 side is reflected by white display media and any appropriate image can be formed. At this time, in the present invention, a color filter 11 is provided on the transparent substrate side, and hence, on a display surface on the transparent substrate side, the reflected light is visually recognized through the color filter 11 as an image of color display. In FIG. 1, the electrically conductive layer 4 and colored layers 15 are formed so as to sandwich the transparent substrate therebetween. However, the colored layers may be formed on the transparent substrate by an inkjet method as in the present invention, and the transparent electrically conductive layer 4, such as ITO, may be formed thereon by sputtering and the like.

That is, in the color display device of the present invention, the color filter 11 forms pixel regions 14 by defining pixels corresponding to the pixel electrodes 2 provided to the drive-side substrate 3 by colorless partition walls 13 which are formed on a substrate 12. Coloring inks of three colors, which are colored with at least blue (B), green (G), and red (R), are ejected by an inkjet method so that the colored layers 15 having given colors are formed in the pixel regions 14. It is preferred that the thicknesses of the partition walls and the colored layers be thinner than the thickness of the micro capsules in order to prevent mixture of colors between the pixels. Moreover, the thickness and height of the partition walls 13 with respect to the thickness of the colored layers 15 vary depending on the kind of image to be displayed on a display device, and its use and the like. However, there is no influence on its color display characteristics because the partition walls are transparent. Further, regarding the pixel regions 14 which are defined by the partition walls 13, also their plane shapes can be optionally chosen from a square, a rectangle, a circle, and the like, in accordance with the kind of image to be displayed, required performance, and the like. In the present invention, as described later in examples, there is a feature that a ratio of the area of the colored layers constituting the pixel regions to the area of the pixel electrodes on the opposing drive-side substrate is preferably 30% or more and 90% or less.

Moreover, in the present invention, regarding the colored layers which are formed by ejecting coloring ink to the pixel regions defined by the partition walls, the area ratio of the colored layers constituting the pixel regions may be set to 90% or less in order to prevent the colored layers from spreading in the respective pixel regions, and prevent mixture of colors between adjacent regions. When the area ratio of the colored layers constituting the pixel regions is equal to or less than this range, even if there remains a region which is not colored, by using the principle of the reflection type display device, a part of the scattered light from the display media passes through the colored layers, and hence no specific problem occurs for performing color display of an intended image. Moreover, it can be excluded that the degree of brightness may be degraded due to mixture of colors which is caused depending on a viewing angle. Further, when producing the color display device of the present invention, acceptable ranges of alignment accuracy for bonding the color filter and positional accuracy for ejecting coloring ink by an inkjet method may be enlarged. Moreover, although depending on the use or required characteristics of a display device, in order to express desired color characteristics, the area ratio of the colored layers constituting the pixel regions is preferably 30% or more, more preferably 40% or more. When the ratio is below this range, it is required that the colored layers are made thicker or the pigment density in the colored layers is made higher in order to obtain desired color characteristics, otherwise desired color characteristics cannot be obtained for display.

Figure 2:
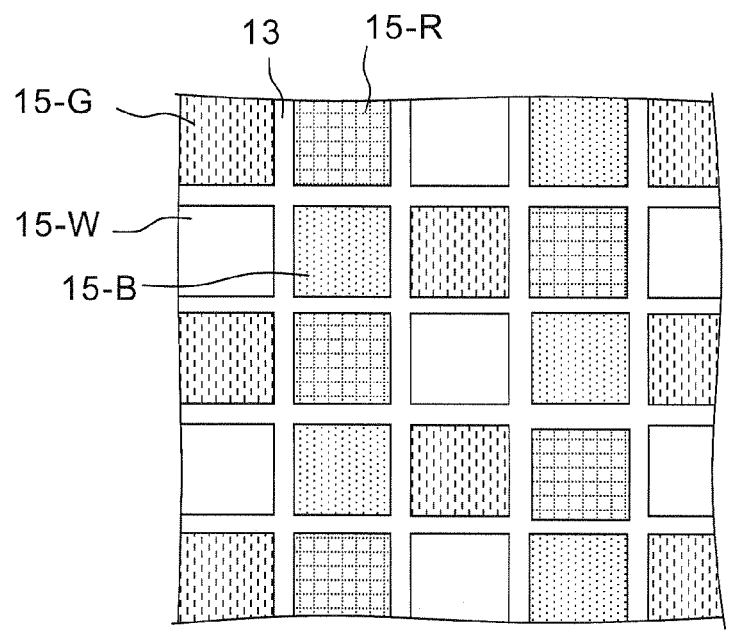
FIG. 2 is a schematic plan view illustrating an example of a coloring pattern of a color filter by colored layers.

Further, as an arrangement pattern in which the colored layers are formed in the pixel regions so as to color the color filter, generally, a pattern of three colors of blue (B), green (G), and red (R) is alternately repeated and arranged, or a mosaic arrangement, a random arrangement, or the like may be adopted. Moreover, as illustrated in FIG. 2, coloring ink may not be ejected to a part of the pixel regions so as to form colorless regions, together with green colored layers 15-G, red colored layers 15-R, and blue colored layers 15-B. The colorless regions have an effect for maintaining brightness of a color display image to be obtained. However, regarding the colorless regions, it is preferred that a colorless layer 15-W be formed by the same transparent resin composition as the material which forms the partition walls 13 (the color of pixels on the display becomes white) because a uniform image without spots can be formed. Especially when the colored layers are formed by an inkjet method as in the present invention, a coloring arrangement pattern can be chosen without the need for a photo mask required for photolithography and for photolithography processes corresponding to the number of coloring, and hence the above-mentioned structure is preferred for reducing an amount of materials and costs of process. Further, it is advantageous as compared with photolithography when four or more colored layers are to be formed.

In the present invention, because the partition walls 13 of the color filter are formed so as to be colorless, incident light from the outside and reflected light from the display media 10 can be used so that a brighter image can be formed. As materials for forming such colorless partition walls, for example, a transparent resin, such as a publicly known acrylic resin or an epoxy resin, may be used, and it is preferred that a transparent resin composition containing no pigment be used for forming the colorless partition walls. As used herein, "transparent" means a state in which the light transmittance of a partition wall formed by being cured is 90% or more. Moreover, the transparent resin composition may include a photo-curing type transparent resin, or a thermosetting type transparent resin. However, as described later, when the partition walls are formed by photolithography, it is preferred to use an ultraviolet curing resin. The transparent resin compositions may be combined with, for example, transparent minute particles, such as silica or precipitated barium, which has a diameter of 100 nm or less, in order to provide adhesion by decreasing strength enhancement or curing contraction of the partition walls as long as the transparency is not degraded. Moreover, this transparent resin composition may be combined with a publicly known polymerization initiator. Further, it is preferred that, in order to provide ink repellency to the surfaces of the partition walls, an oligomer which is copolymerized with a fluorine-containing acrylic monomer, a fluorine-containing surfactant, or the like be combined.

On the other hand, regarding the coloring ink for forming the colored layers in the pixel regions, publicly known materials may be chosen as components as long as liquid droplets can be stably and continuously ejected from an inkjet head, and the materials may be used by being adjusted so as to obtain ink suitable physical properties as described later. As such a component, it is preferred to use organic pigments which are obtained by dissolving an ultraviolet curing or thermosetting resin as a main constituent in a colorless solvent whose boiling point is 200° C. suitable for inkjet continuous ejection, and further, by being minutely dispersed to 100 nm or less as coloring ingredients and stabled.

In the present invention, regarding the coloring ink, ejection stability and the like in an inkjet method are taken into account. As such an example, when a general inkjet head of a piezo-electric element is used, as a required condition for stably forming liquid droplets, depending on a head constitution and the like, as for the temperature in the head, it is generally favorable that the viscosity of coloring ink is 3 to 150 mPa·sec, preferably 4 to 30 mPa·sec. When the viscosity of coloring ink is more than 150 mPa·sec, ejection may not be performed, and, to the contrary, when the viscosity of coloring ink is less than 3 mPa·sec, an amount of ejection may be unstable. Moreover, the surface tension of the coloring ink is preferably in the range of 20 to 40 mN/m at the temperature in the head. When the surface tension is more than 40 mN/m, ejection may not be performed, and, to the contrary, when the surface tension is less than 20 mN/m, an amount of droplets during continuous ejection may be unstable. Note that, the temperature in the head is, depending on the material stability of coloring ink to be used, generally a room temperature of 20° C. to 45° C., and a temperature of about 40° C. is adopted in order to enhance the film thickness by increasing the solid compound in the coloring ink.

As an example of the process for producing the color display device of the present invention, first, a transparent resin composition, which does not contain a pigment but contains an ultraviolet curing resin, is applied to a substrate which is made of a resin film, such as glass and a PET film, and, by publicly known photolithography, the partition walls which define the pixels of the display device are formed corresponding to the pixels. At this time, some of the pixel regions defined by the partition walls may remain without being etched so that a part of the pixel regions forms colorless layers which are made of the same material as that of the partition walls. Moreover, it is preferred that a fluorine or silicon compound be added to the transparent resin composition so that the obtained partition walls have ink repellency, or the surfaces of the partition walls be processed by plasma gas containing fluorine or the like, thereby maintaining the static contact angle between the coloring ink and the partition wall surface, which is to be described later, within 35 to 65°.

Next, with an inkjet method by using a publicly known inkjet apparatus, coloring inks of three colors, which are colored by at least blue (B), green (G), and red (R), are ejected to given pixel regions whose pixels are defined by the partition walls. Then, after drying the coloring ink on a hot plate, a curing method of ultraviolet rays irradiation is performed, and after that, colored layers are formed in the given pixel regions to obtain a color filter. When the coloring ink is ejected to the pixel regions, an area ratio of the colored layers to the pixel regions is set to at least 30% or more and 90% or less so that mixture of the coloring inks between adjacent pixel regions can surely be prevented, and further, color display of an intended image can be obtained while minimizing the used amount of the coloring ink.

When producing a color display device, under a state in which a substrate is bonded to a transparent substrate side of a monochrome display device of reflection type, a color filter may be obtained as described above, or, after obtaining a color filter, the substrate may be positioned and bonded to the transparent substrate side of the monochrome display device. Moreover, colored layers may be formed on a transparent substrate by an inkjet method as in the present invention, and the transparent electrode layer 4 of ITO or the like may be formed thereon by sputtering and the like so as to obtain a color filter substrate, and, after that, the color filter substrate may be bonded to a micro capsule layer which has been formed in advance on a drive-side substrate. When bonding, a cell bonding apparatus, which is normally used in a liquid cell producing process, is used.

EXAMPLES

In the following, the present invention is more specifically described by way of examples. However, the present invention is not limited thereto. Further, unless otherwise noted, "part(s)" refers to part(s) by weight.

Example 1

(Preparation of Transparent Resin Composition (A1))

An alkali-developable photocurable resin V-259ME (manufactured by Nippon Steel Chemical Co., Ltd.: solid content 56.5%, propylene glycol methyl ether acetate solvent) (205 parts), a mixture of dipentaerythritol hexaacrylate and a dipentaerythritol pentaacrylate (manufactured by NIPPON KAYAKU Co., Ltd.: Kayarad DPHA) (50 parts), a biphenyl-type epoxy resin YX4000HK (manufactured by Japan Epoxy Resins Co., Ltd.) (25 parts), IRGACURE 907 (manufactured by Chiba Japan Corporation) (5 parts), 4,4'-N,N-diethyl-4,4'-diphenyl EAB-F (manufactured by Hodogaya Kagaku Corporation) (0.8 part), a silane coupling agent S-510 (manufactured by CHISSO CORPORATION) (1.9 parts), a fluorine surfactant F470 (manufactured by DIC Corporation) (0.2 part), and a diethylene glycol dimethyl ether (608 parts) were used to be uniformly mixed. The mixture was filtered by using a micro filter of 0.2 μm so as to obtain a transparent resin composition (A1) (solid content concentration 22 weight %).

(Preparation of Coloring Inks (R1, G1, B1))

As shown in Table 1, under a state of coexistence of a polymeric dispersant by using fine pigment for a color filter, dispersion was performed in a bead mill with a diethylene glycol monoethyl ether acetate as a solvent so that dispersion liquids of red, green, and blue were prepared. The dispersion liquids were mixed according to the composition shown in Table 1, and filtered by a micro filter of 1 μm under pressure so as to prepare inkjet coloring inks of three colors. In addition, the physical properties of these inks are shown in Table 1.

Note that the abbreviations in Table 1 represent the following.

"PGMEA": Propylene glycol monomethyl ether acetate
"DPHA": Mixture of dipentaerythritol propane hexaacrylate and pentaacrylate (manufactured by NIPPON KAYAKU Co., Ltd.)
"YX4000HK": Tetramethyl biphenyl epoxy resin (manufactured by Japan Epoxy Resins Co., Ltd.)
"S510": 3-Glycidoxypropyltrimethoxysilane (Sila-Ace S-510 manufactured by CHISSO CORPORATION)
"BYK-330": Polyether modified polydimethylsiloxane-based surfactant (manufactured by BYK-Chemie GmbH)
"EGDAC": Diethylene glycol monoethyl ether acetate (manufactured by Daicel Corporation)
"PR254": C.I. Pigment Red 254
"PY150": C.I. Pigment Yellow 150
"PG36/PY150=50/50": Dispersion of C.I. Pigment Green 36 and C.I. Pigment Yellow 150
"PB15:6": C.I. Pigment Blue 15:6

Moreover, regarding the physical properties shown in Table 1, the ink viscosities were measured by an E-type viscometer at 23° C. Moreover, the ink surface tensions were measured based on a buoyancy method with a platinum plate by using CBVP-Z (manufactured by Kyowa Interface Science Co., LTD.) at 23° C. Further, regarding the surface shape and size of the colored pixels described later, the filled-up state just after drawing was measured by using an optical microscope, and the shape was measured by using an optical interference profiler WYCO NT 1100 (manufactured by Veeco Instruments Inc.).

TABLE 1

| Sample | Red R1 | Green G1 | Blue B1 |
| --- | --- | --- | --- |
| Resin component in V-259ME | 10.6 parts | 10.2 parts | 10.7 parts |
| PGMEA | 8 parts | 7.8 parts | 8.2 parts |
| DPHA | 7 parts | 6.8 parts | 7.1 parts |
| YX4000HK | 1.8 parts | 1.7 parts | 1.8 parts |
| S510 | 0.5 part | 0.5 part | 0.5 part |
| BYK-330 | 0.03 part | 0.03 part | 0.03 part |
| EGDAC | 70 parts | 70 parts | 70 parts |
| PR254 | 1.5 parts | — | — |
| PY150 | 0.4 part | — | — |
| PG36/PY150 = 50/50 | — | 2.8 parts | — |
| PB15: 6 | — | — | 1.9 parts |
| Solid content (wt %) | 21.3 | 21.6 | 20 |
| Viscosity (mPa · sec, 23° C.) | 10.2 | 10.5 | 9.8 |
| Surface tension (mN/m, 23° C.) | 25 | 25 | 25 |

(Production of Color Filter)

The transparent resin composition (A1), which was prepared as described above, was uniformly applied to a non-alkali glass substrate of 6 inches square (thickness of 0.7 mm), and was dried on a hot plate at 80° C. for 1 minute. Next, through a given photo mask, collective ultraviolet rays exposure (luminance I ray standard 30 mJ) of 300 mJ was performed, a non-exposure portion was removed by developing for 60 seconds in a KOH aqueous solution of 0.05% (23° C.) with a spray pressure of 1 kg/cm$^2$G, and washing with purified water was performed. Further, heating was performed in an oven for 30 minutes at 230° C. so as to obtain the colorless partition wall 13 of 2.1 μm in height as illustrated in FIG. 3 and FIG. 4.

Next, by using an atmospheric pressure plasma apparatus, the surfaces of the partition walls 13 formed on the non-alkali glass substrate were processed by oxygen/Ar, and subsequently, fluorine gas plasma processing was performed so as to obtain a color filter substrate including partition walls having ink repellant surfaces whose contact angle to a butyl carbitol acetate (BCA) was 60°.

Figure 3:
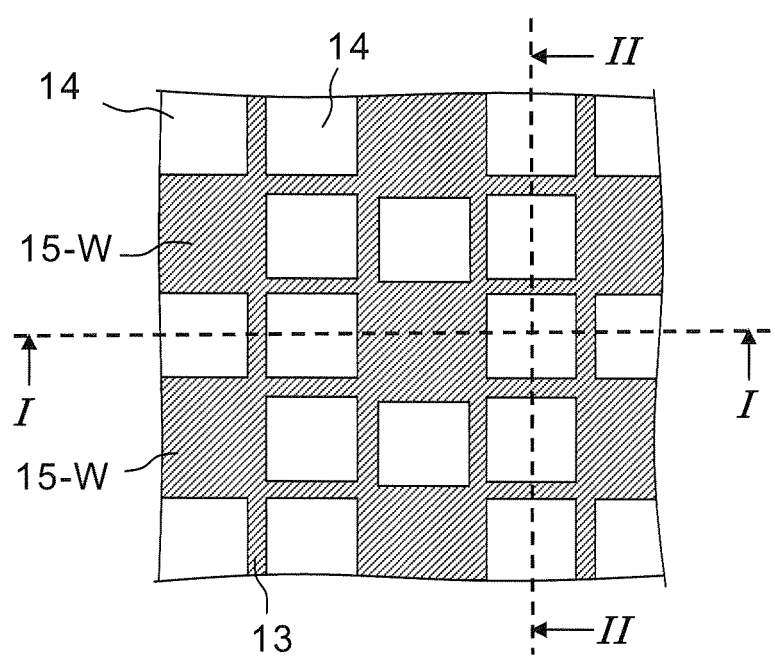
FIG. 3 is a schematic plan view (partial) illustrating a state of the color filter produced in Example 1.
Figure 4A:
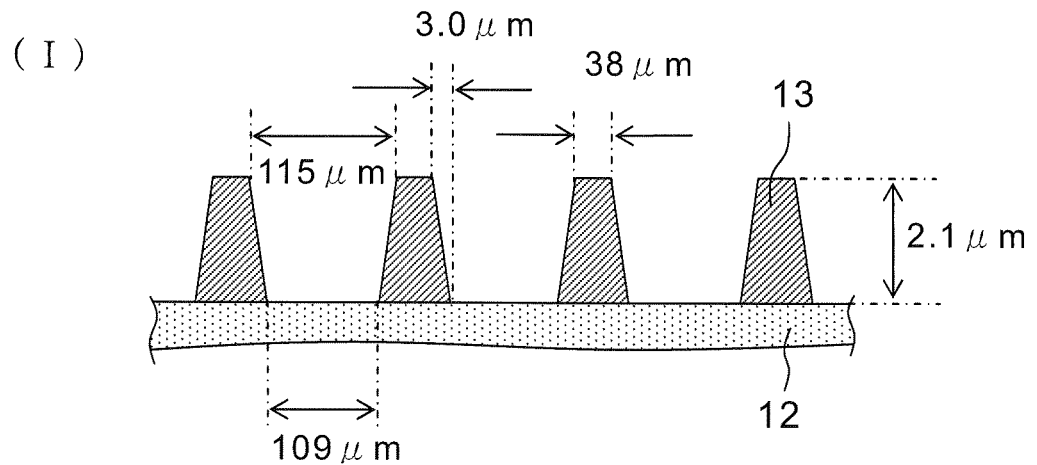
FIG. 4 are schematic cross-sectional views illustrating states of partition walls which are provided to the color filter of FIG. 3.
Figure 4B:
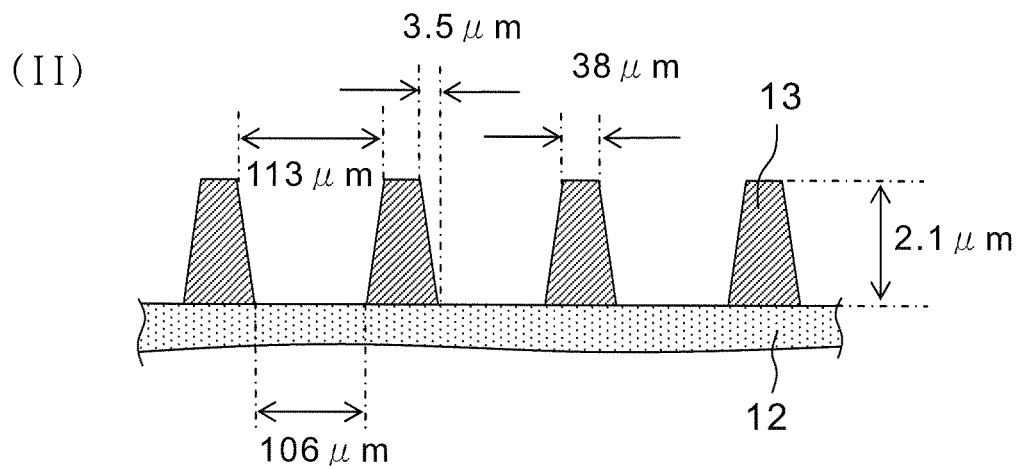
Figure 5A:
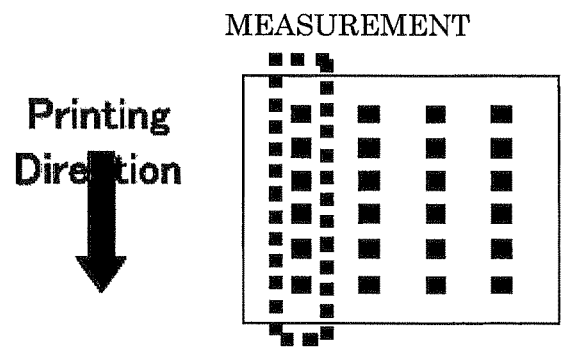
FIG. 5 shows the measurement results of chromaticity distributions of respective colored layers of three colors, which are provided to the color filter produced in Example 1.
Figure 5B:
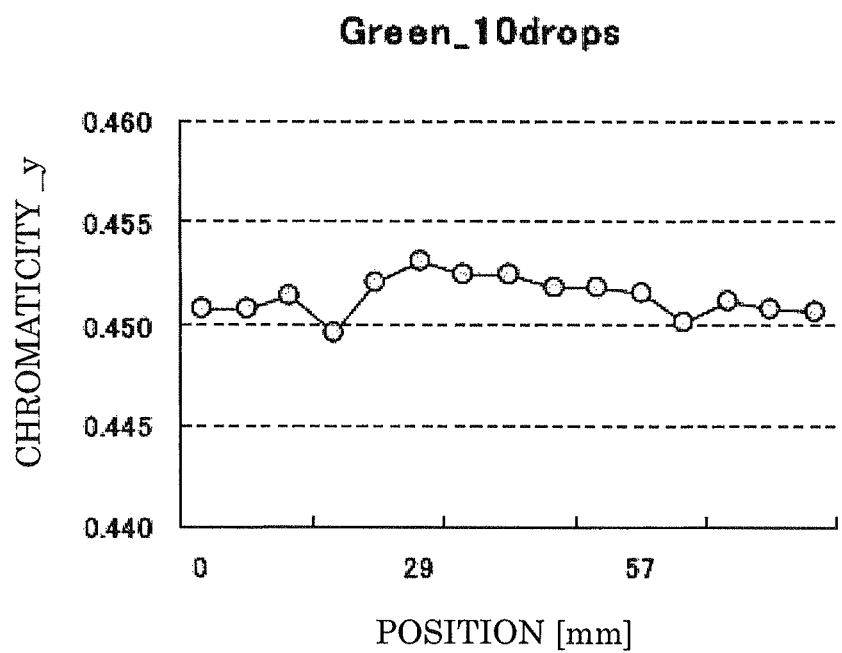
Figure 5C:
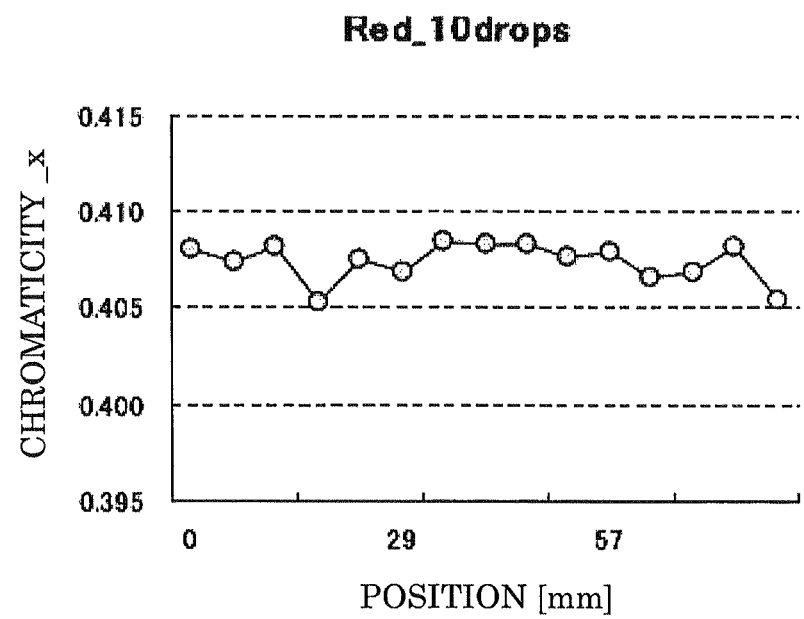
Figure 5D:
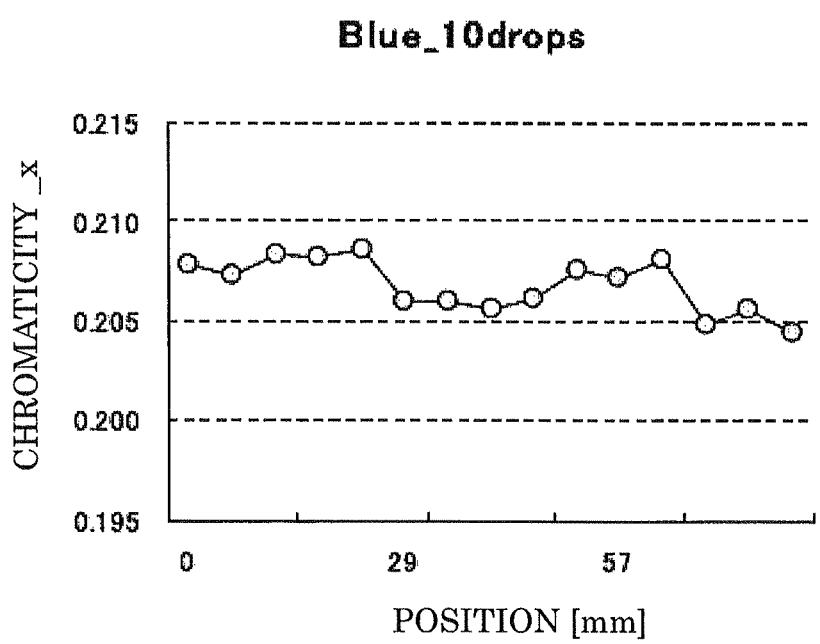

Here, FIG. 3 is a schematic plan view illustrating the partition walls 13 which are formed on a non-alkali glass substrate, FIG. 4(I) corresponds to the I-I cross-sectional view in FIG. 3, and FIG. 4(II) corresponds to the II-II cross-sectional view. That is, a plurality of pixel regions are formed by the partition walls 13 on the non-alkali glass substrate with a pitch of 153 μm×151 μm so as to correspond to a pixel pitch of a monochrome display device described later. Accordingly, the colored regions, which are formed by the transparent partition walls having surface ink repellency, are filled up with the coloring inks with respect to partition wall opening portions. Therefore, the plane region of at most 115 μm×113 μm is described as the pixel region 14 which is defined by the partition walls 13. A color filter to be used in a 6 inch panel of 800×600 pixels having one pixel in a size of 153 μm×151 μm was hereunder produced. The aperture pixel size of a TFT substrate used on the drive side is 133 μm×131 μm. Accordingly, the area of the colored layers, which are colored by inkjet ink, is at most 76% in comparison to the area of the pixel electrodes on the opposing drive-side substrate. Moreover, in Example 1, a part of the portion corresponding to the pixel regions 14 was exposed so that the colorless layers 15-W made of the transparent resin composition (A1) were provided.

Next, there was prepared an inkjet apparatus in which three inkjet heads KM216DPN manufactured by Konica Minolta Corporation were mounted on an inkjet printer M500 manufactured by Litrex Corporation. Coloring inks of three colors (R1, G1, B1) were simultaneously printed under the following conditions so as to obtain the colored pattern illustrated in FIG. 2 with respect to the pixel regions 14 of the non-alkali glass substrate 12 including the partition walls 13. At this time, non-ejection from the nozzle was not confirmed, and a good continuous ejection characteristic was exhibited.

Jetting speed: 4.1 m/s
Printing speed: 305 mm/s
Liquid droplet volume: 15 pl/droplet (10 droplets are ejected to one pixel region)

After printing by an inkjet method so as to obtain a given colored pattern illustrated in FIG. 2, preliminary drying was performed for 3 minutes so that the temperature of the non-alkali glass substrate 12 becomes 80° C., and further, baking was performed for 30 minutes at 230° C. so as to produce a color filter including colored layers. The thus obtained color filter was examined by using an optical interference profiler WYCO NT 1100 (manufactured by Veeco Instruments Inc.), and it was found that any of the surfaces of the colored layers in respective pixel regions had a convex shape, and the thickest portion thereof had a thickness of 3.5 μm. Further, an area ratio of the colored layers to one pixel electrode was 75%.

(Performance Evaluation of Color Filter)

Regarding the obtained color filters described above, by using a colorimeter manufactured by Otsuka Electronics Co., Ltd., transmission chromaticities were measured with respect to a limited region of a plane central portion 100 μm×100 μm of each colored layer. The results are shown in Table 2. Moreover, FIG. 5 shows the measurement results of chromaticity distributions of respective colors in the plane of the glass substrate of 6 inches square. As apparent from the results, it was confirmed that color filters having uniform chromaticity distributions were obtained. Further, white balance was similarly measured when transmitting, with the measurement limited to a region of 300 μm×300 μm such that the colorless partition walls were included and also the colored layers of three colors and the colorless layers were included. The results are shown in Table 3, and it was found that the white balance was substantially achromatic color, and the brightness Y was high enough to be suitable for bright electronic paper.

TABLE 2

| Example | Filled-up liquid droplet number | Red chromaticity | | | Green chromaticity | | | Blue chromaticity | | |
|---|---|---|---|---|---|---|---|---|---|---|
| | | x | y | Y | x | y | Y | x | y | Y |
| 1 | 10 | 0.414 | 0.321 | 49.3 | 0.334 | 0.449 | 82.2 | 0.208 | 0.243 | 45.6 |
| 2 | 8 | 0.366 | 0.313 | 63.8 | 0.33 | 0.398 | 88.6 | 0.236 | 0.271 | 61.4 |
| 3 | 10 | 0.428 | 0.327 | 52.8 | 0.34 | 0.481 | 82 | 0.189 | 0.229 | 42.9 |
| 4 | 8 | 0.400 | 0.323 | 59.4 | 0.34 | 0.459 | 85.7 | 0.202 | 0.242 | 50.2 |

TABLE 3

| | Liquid droplet | White balance | | |
|---|---|---|---|---|
| Example | number | x | y | Y |
| 1 | 10 | 0.313 | 0.317 | 80 |
| 2 | 8 | 0.315 | 0.316 | 84 |
| 3 | 10 | 0.312 | 0.319 | 79 |
| 4 | 8 | 0.312 | 0.319 | 83 |

(Production of Color Display Device)

The obtained color filter as described above was fixed, as described below, to a transparent substrate side of an electronic book Kindle (D701, manufactured by Amazon Inc.), which is an electrophoresis monochrome display device using micro capsules, so as to obtain the color display device of Example 1.

Figure 6:
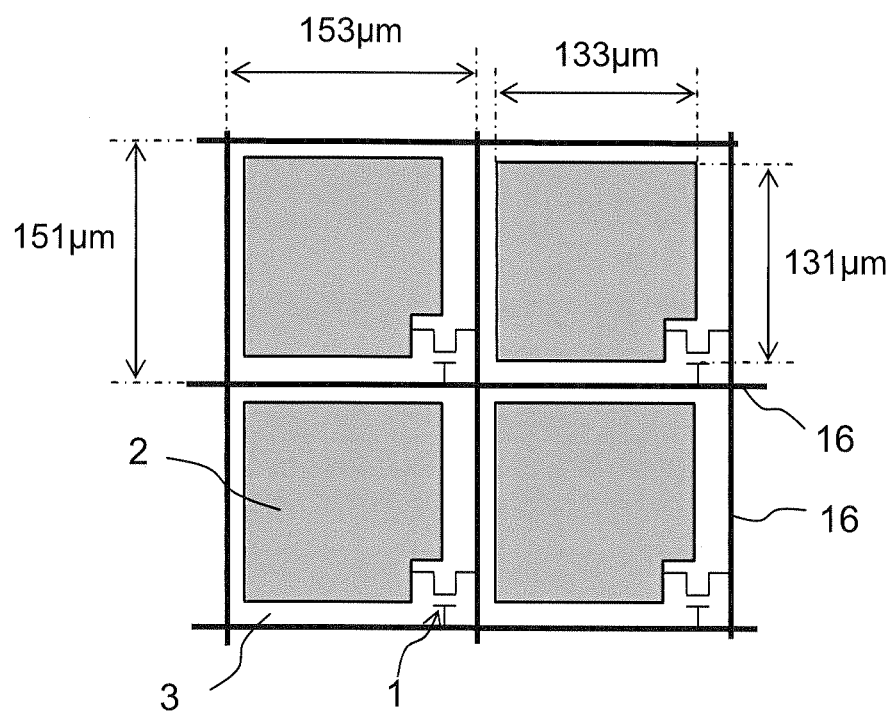
FIG. 6 is a schematic plan view illustrating a state of a drive-side substrate in a color display device of Example 1.

In this electronic book Kindle, as illustrated in FIG. 1, the display media made of the charged white particles and black particles were contained in the micro capsules, and were enclosed between the drive-side substrate and the transparent substrate. On the drive-side substrate 3, as illustrated in FIG. 6, in the ITO electrodes (pixel electrodes) 2 connected to the TFTs (pixel switches) 1, a plurality of TFT apertures 16 were formed in a given pattern via wirings 17 which were extended in a lattice shape with a pitch of 153 μm×151 μm. Then, among the regions where the TFT apertures 16 are projected to the transparent substrate side, a portion corresponding to the ITO electrode 2 having the size of 133 μm×131 μm substantially corresponds to one pixel forming an image which is drawn on the display surface on the transparent substrate side. This electronic book Kindle includes the display surface made of 800×600 pixels.

When the obtained color filter described above was to be fixed to this electronic book Kindle, the color filter was positioned in such a way that the center of gravity of the TFT aperture 16 and the center of gravity of the pixel region in the color filter coincide with each other, and the substrate of the color filter was bonded to the transparent substrate side of the electronic book Kindle via an acrylic adhesive so as to complete the color display device according to the present invention. Regarding the obtained color display device, when the electronic book Kindle was turned on, and an image was being drawn on the display surface, the image was displayed with colors through the color filter so as to be capable of being visually recognized sufficiently without coloring the white portion even in the room, and without degrading the brightness which was originally provided to the electronic book Kindle. When lighting the pixels of respective colors, no mixture of colors between the colored pixels was found, and in comparison to the case in which the monochrome display before the color filter was fixed was defined as 100%, any of the refection ratios of the color display elements exceeded 60%, and it was confirmed a bright panel was obtained.

Example 2

A color filter was obtained similarly to Example 1 with the exception that eight droplets were ejected to one pixel region. This color filter was examined similarly to Example 1, and it was found that any of the surfaces of colored layers in respective pixel regions had a convex shape, and the thickest portion thereof had a thickness of 3.0 μm. Moreover, an area ratio of the colored layers to one pixel electrode was found to be 67%. Further, by using a colorimeter manufactured by Otsuka Electronics Co., Ltd., chromaticities and white balances of the respective colored layers were measured similarly to Example 1. The results are shown in Tables 2 and 3. As a result, it was found that the white balance was substantially achromatic color, and the brightness Y is high enough to be suitable for bright electronic paper.

Similarly to Example 1, this color filter was bonded to the transparent substrate side of the electronic book Kindle via a transparent acrylic adhesive so as to complete the color display device according to Example 2. Then, similarly to Example 1, when an image was being drawn on the display surface, the image was displayed with colors through the color filter so as to be capable of being visually recognized sufficiently without coloring the white portion even in the room, and without degrading the brightness which was originally provided to the electronic book Kindle.

Examples 3 and 4

A fluorine-containing acrylic oligomer solution (20% solid content concentration) of 2 parts was added to the transparent resin composition (A1) used in Example 1 so as to obtain a transparent resin composition (A2). By using this transparent resin composition (A2), colorless partition walls of 2.1 μm in height were formed on a non-alkali glass substrate (thickness of 0.7 mm) by photolithography similarly to Example 1. It was found that the contact angle to butyl carbitol acetate was 40° even when surface plasma processing similar to Example 1 was not performed.

Two color filter substrates including the partition walls were prepared as described above. One of the color filter substrates was used to produce the color filter similarly to Example 1, namely, the liquid droplet amount of the coloring ink per pixel region was ten droplets (Example 3). The other color filter substrate was used to produce the color filter similarly to Example 2, namely, the liquid droplet amount of the coloring ink per pixel region was eight droplets (Example 4).

The obtained color filters of two kinds as described above were examined similarly to Example 1, and it was found that any of the surfaces of colored layers in respective pixel regions was plane in comparison to the cases of Examples 1 and 2, the thickest portion in the color filter of Example 3 had a thickness of 2.5 μm, and the thickest portion in the color filter of Example 4 had a thickness of 2.1 μm. Moreover, in the color filter of Example 3, an area ratio of the colored layers to one pixel electrode was found to be 75%, and in the color filter of Example 4, an area ratio of the colored layers to one pixel electrode was found to be 76%. Further, by using a colorimeter manufactured by Otsuka Electronics Co., Ltd., chromaticities and white balances of respective colored layers were measured similarly to Example 1. The results are shown in Tables 2 and 3. As a result, it was found that the white balance was substantially achromatic color, and the brightness Y is high enough to be suitable for bright electronic paper.

Then, regarding these two kinds of color filters, color display devices were produced by using the electronic books Kindle similarly to Example 1. Then, images were being drawn on the display surfaces similarly to Example 1, and it was confirmed that the color images were displayed with an equivalent level to that of Example 1 for both color display devices.

Comparative Example 1

A resin black matrix was formed on non-alkali glass having a thickness of 0.7 mm by photolithography so that each of the colored portions was 131 μm×133 μm and so as to obtain an colored pattern of red, green, blue, and white similarly to FIG. 1. At this time, the black matrix had a film thickness of 2 μm, an optical density OD of 4, and surface ink repellency. In this resin black matrix, R1, G1, and B1 inks and a photosensitive transparent resin ink were filled by an inkjet with a colored pattern similar to FIG. 1 so as to produce a 6-inch color filter whose film thickness was 1.8 μm after being cured.

This color filter was bonded onto a 6-inch electronic paper panel of 600×800 pixels whose one pixel had a size of 151 μm×153 μm (the aperture pixel size of the TFT substrate was 131 μm×133 μm) so as to produce a color display element. Comparing to monochrome display before the color filter was bonded, the reflection ratio of the color display element was less than 50% and the brightness was insufficient for a panel.

Comparative Example 2

A PET film A4100 manufactured by TOYOBO Co., LTD. (thickness of 125 μm) was cut into a 7-inch size, and was bonded onto a glass substrate. Then, transparent partition walls having a film thickness of 2 μm were formed with a transparent photosensitive resin composition by photolithography so that the colored region became 131 μm×133 μm. The photosensitive resin composition has a component of a fluorine-containing oligomer, and hence the surfaces of the obtained partition walls have ink repellency. In the partition walls, photosensitive transparent resin inks of R1, G1, and B1 inks were filled by an inkjet similarly to Comparative Example 1 so as to produce a 6-inch color filter whose film thickness was 1.8 μm after being cured.

This film color filter was bonded onto a 6-inch electronic paper panel of 600×800 pixels whose one pixel pitch was 151 μm×153 μm (the pixel electrode size of the TFT substrate was 131 μm×133 μm) so as to produce a color display element. When lighting the pixels of each color, it was found that mixture of colors between the colored pixels partially occurred.

REFERENCE SIGNS LIST

1: pixel switch
2: pixel electrode
3: drive-side substrate
4: electrically conductive layer
5: transparent substrate
6: white particle
7: black particle
8: dispersion medium
9: micro capsule
10: display medium
11: color filter
12: substrate
13: partition wall
14: pixel region
15: colored layer
16: wiring

The invention claimed is:

1. A color display device, comprising:
a drive-side substrate on which pixel electrodes connected to pixel switches are formed in a given pattern;
a transparent substrate including an electrically conductive layer;
display media which have white color and black color and are electrically charged;
a reflection type display element including the display media disposed between the drive-side substrate and the transparent substrate, for forming any appropriate image by pixels corresponding to the pixel electrodes; and
a color filter provided on the transparent substrate side of the reflection type display element,
wherein the color filter comprises a substrate that is arranged opposite to the drive-side substrate with respect to the transparent substrate, and wherein the color filter forms pixel regions by defining the pixels with colorless partition walls formed on the substrate, and has colored layers formed therein by ejecting colored inks of three colors, which are colored with at least blue (B), green (G), and red (R), by an inkjet method.

2. A color display device according to claim 1, wherein:
the partition walls are formed by a transparent resin composition; and
a part of the pixel regions has a colorless layer which is formed by the transparent resin composition.

3. A color display device according to claim 1, wherein an area ratio of the colored layers to the pixel regions is 30% or more and 90% or less.

4. A. method of producing a color display device,
the color display device comprising:
a drive-side substrate on which pixel electrodes connected to pixel switches are formed in a given pattern;
a transparent substrate including an electrically conductive layer;
display media which have white color and black color and are electrically charged;
a reflection type display element including the display media disposed between the drive-side substrate and the transparent substrate, for forming any appropriate image by pixels corresponding to the pixel electrodes; and
a color filter provided on the transparent substrate side of the reflection type display element,
the method comprising:
applying a transparent resin composition containing an ultraviolet curing resin to a substrate that is arranged opposite to the drive-side substrate with respect to the transparent substrate, and forming partition walls by photolithography to define the pixels; and
thereafter ejecting colored inks of three colors, which are colored with at least blue (B), green (G), and red (R), by an inkjet method to the pixel regions defined by the partition walls, for forming colored layers in given pixel regions to obtain the color filter.

5. A method of producing a color display device according to claim 4, wherein, when the partition walls are formed by photolithography, a part of the pixel regions is configured to include a colorless layer which is made of the same material as a material of the partition walls.

6. A method of producing a color display device according to claim 4, wherein the colored inks are ejected by an inkjet method so that an area ratio of the colored layers to the pixel regions becomes 30% or more and 90% or less.

7. A color display device according to claim 2, wherein an area ratio of the colored layers to the pixel regions is 30% or more and 90% or less.

8. A method of producing a color display device according to claim 5, wherein the colored inks are ejected by an inkjet method so that an area ratio of the colored layers to the pixel regions becomes 30% or more and 90% or less.

* * * * *